US011632596B2

(12) United States Patent
Nielsen

(10) Patent No.: US 11,632,596 B2
(45) Date of Patent: *Apr. 18, 2023

(54) TIMELY ADDITION OF HUMAN-PERCEPTIBLE AUDIO TO MASK AN AUDIO WATERMARK

(71) Applicant: The Nielsen Company (US), LLC, New York, NY (US)

(72) Inventor: Christen V. Nielsen, Dunedin, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,543

(22) Filed: Jun. 6, 2022

(65) Prior Publication Data

US 2022/0303638 A1 Sep. 22, 2022

Related U.S. Application Data

(63) Continuation of application No. 17/301,866, filed on Apr. 16, 2021, now Pat. No. 11,395,048, which is a
(Continued)

(51) Int. Cl.
*H04N 21/81* (2011.01)
*H04N 21/858* (2011.01)
*H04N 21/8358* (2011.01)

(52) U.S. Cl.
CPC ....... *H04N 21/812* (2013.01); *H04N 21/8106* (2013.01); *H04N 21/8358* (2013.01); *H04N 21/858* (2013.01)

(58) Field of Classification Search
CPC ............ H04N 21/812; H04N 21/8106; H04N 21/8358; H04N 21/858
See application file for complete search history.

(56) References Cited

U.S. PATENT DOCUMENTS 8,041,058 B2 10/2011 Kentish et al.
8,127,137 B2 2/2012 Levy
(Continued)

FOREIGN PATENT DOCUMENTS

| CN | 110197053 | 9/2019 |
| EP | 2 012 269 | 7/2009 |
| GB | 2 375 907 | 11/2002 |

*Primary Examiner* — James R Sheleheda
(74) *Attorney, Agent, or Firm* — McDonnell Boehnen Hulbert & Berghoff LLP

(57) ABSTRACT

A method and system for adding overtly human-perceptible supplemental audio content into a media stream to help mask audio effects of an audio watermark in the media stream. A method involves receiving a media stream that defines a sequence of audio content presentable by a content presentation device, modifying the media stream to produce a modified media stream that defines the sequence of audio content, and outputting the modified media stream for presentation by the content presentation device. The modified media stream includes an audio watermark that is machine-detectable to trigger an interactive event. Further, the act of modifying the media stream involves adding into the media stream supplemental audio content coincident with the audio watermark, to help mask the audio watermark in the modified media stream during presentation of the modified media stream by the content presentation device.

20 Claims, 7 Drawing Sheets

Related U.S. Application Data continuation of application No. 15/929,236, filed on Mar. 3, 2020, now Pat. No. 11,012,757.

(56) References Cited

U.S. PATENT DOCUMENTS

| | | |
|---|---|---|
| 8,625,839 B2 | 1/2014 | Grill et al. |
| 9,037,453 B2 | 5/2015 | Grill et al. |
| 9,055,309 B2 | 6/2015 | Neumeier et al. |
| 10,805,626 B2 | 10/2020 | Deshpande et al. |
| 11,012,757 B1* | 5/2021 | Nielsen ............... H04N 21/8358 |
| 11,395,048 B2* | 7/2022 | Nielsen ............... H04N 21/8358 |
| 2001/0044899 A1 | 11/2001 | Levy |
| 2002/0021824 A1 | 2/2002 | Reed et al. |
| 2002/0059644 A1 | 5/2002 | Andrade et al. |
| 2002/0104090 A1 | 8/2002 | Stettner |
| 2002/0122369 A1 | 9/2002 | Sako et al. |
| 2003/0192060 A1 | 10/2003 | Levy |
| 2003/0219143 A1 | 11/2003 | Maskowitz et al. |
| 2006/0168448 A1 | 7/2006 | Van Der Veen et al. |
| 2007/0186269 A1 | 8/2007 | Malik |
| 2011/0185179 A1 | 7/2011 | Swaminathan et al. |
| 2011/0246202 A1* | 10/2011 | McMillan ............. G10L 19/018 715/764 |
| 2013/0031582 A1 | 1/2013 | Tinsman et al. |
| 2014/0075470 A1 | 3/2014 | Oh et al. |
| 2014/0150022 A1 | 5/2014 | Oh et al. |
| 2014/0245339 A1 | 8/2014 | Zhang et al. |
| 2014/0250479 A1 | 9/2014 | Lee et al. |
| 2014/0282677 A1 | 9/2014 | Mantell et al. |
| 2015/0341410 A1 | 11/2015 | Schrempp et al. |
| 2016/0055607 A1 | 2/2016 | Petrovic et al. |
| 2016/0182973 A1 | 6/2016 | Winograd et al. |
| 2017/0070790 A1 | 3/2017 | Misra et al. |
| 2017/0164071 A1 | 6/2017 | An et al. |
| 2018/0220200 A1 | 8/2018 | Winograd |
| 2018/0376156 A1 | 12/2018 | Deshpande et al. |
| 2019/0306577 A1 | 10/2019 | Jeong et al. |
| 2020/0204875 A1 | 6/2020 | Nielsen et al. |
| 2020/0304821 A1 | 9/2020 | Davis et al. |
| 2021/0037294 A1* | 2/2021 | Stavropoulos ..... H04N 21/2407 |
| 2021/0266617 A1* | 8/2021 | Ropke ................. H04N 21/812 |
| 2021/0295381 A1 | 9/2021 | Wackerbauer et al. |
| 2021/0344981 A1* | 11/2021 | Merchant ......... H04N 21/23424 |

* cited by examiner

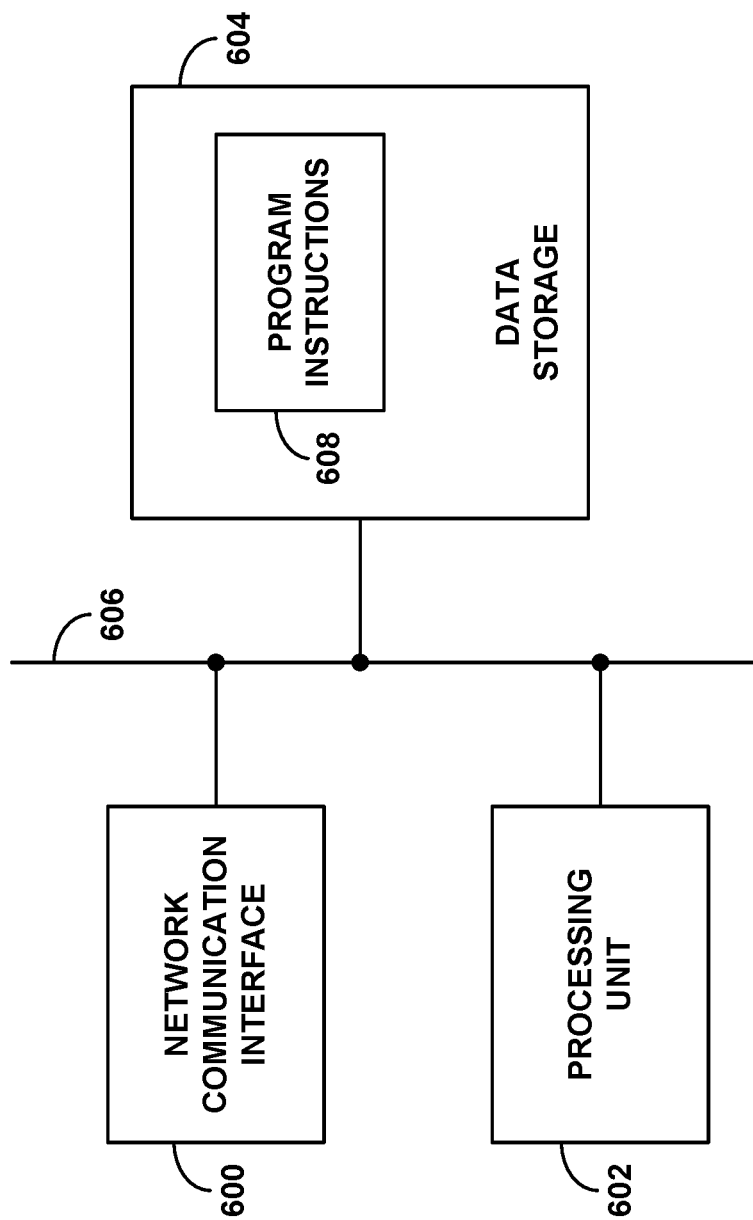

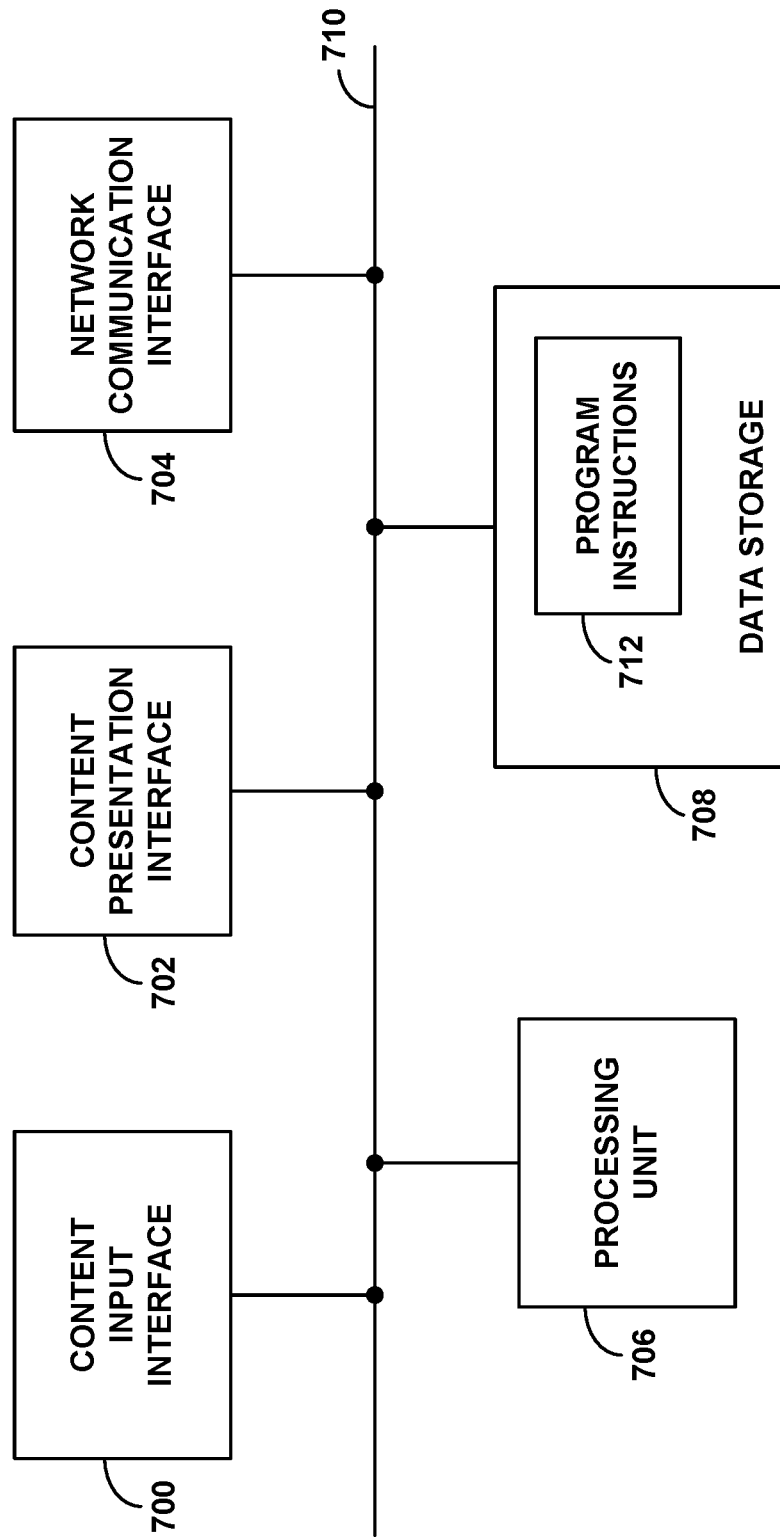

TIMELY ADDITION OF HUMAN-PERCEPTIBLE AUDIO TO MASK AN AUDIO WATERMARK

REFERENCE TO RELATED APPLICATIONS

This is a continuation of U.S. patent application Ser. No. 17/301,866, filed Apr. 16, 2021, which is a continuation of U.S. patent application Ser. No. 15/929,236, filed Mar. 3, 2020, the entirety of each of which is hereby incorporated by reference.

BACKGROUND

A typical media client operates to receive an analog or digital media stream representing media content such as video and/or audio content and to process the media stream for presentation by the media client or an associated entity on a user interface such as a display screen and/or an audio speaker. Examples of such media clients could include televisions, computer monitors, projection systems, loudspeakers, headphones, set top boxes (e.g. cable or satellite TV receivers), digital video recorders, radios, personal computers, mobile communication devices, gaming consoles, streaming media players, and/or combinations of these or other devices.

By way of example, a television could receive a broadcast stream (e.g., over the air, from a set top box, through an Internet connection, or in another manner) and could present the media content of that broadcast stream to a user. As another example, a set top box could receive a broadcast stream from a Multi-channel Video Program Distributor (MVPD) and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

When a media stream that includes at least audio content is transmitted to a media client to be processed for presentation, it may be desirable to include in the media stream an audio watermark that the media client or another entity could detect as a trigger for initiating an interactive event.

For example, it may be desirable to insert an audio watermark into a TV broadcast stream so that, during playout of the broadcast stream by a recipient TV, the recipient TV or second device (e.g., a cell phone, tablet, or smart watch within audio range of the TV) could detect the audio watermark and responsively initiate an interactive event related to content of the broadcast stream. For instance, if a broadcast stream includes an advertisement for a good or service (whether by product placement in programming, or in a commercial break), it may be desirable to insert into the broadcast stream an audio watermark that would cause the recipient TV or second device to present an actionable prompt (e.g., video prompt or voice-command prompt) to which a user could respond in order to visit an online-store where the user can buy the advertised good or service or an item related to the advertised good or service.

Unfortunately, however, it could be impractical to insert an audio watermark at a desired time point in the media stream, such as at or just preceding a time in the media stream where it would make sense to trigger the desired interactive event. In the above example, for instance, it could be impractical to insert the audio watermark into the TV broadcast stream at or near a time point where the good or service is advertised in the broadcast stream, to trigger presentation of an associated prompt for user action at or near the time of playout of that advertisement.

Inserting the audio watermark at a desired time point in the media stream could be impractical because, depending on the underlying audio content of the media stream where the audio watermark would be inserted, the audio watermark itself may be human perceptible.

In particular, an audio watermark could comprise a sequence of sin waves that represent data, and adding that sequence of sin waves into the underlying audio content of the media stream could distort the underlying audio content, as the sin waves may constructively and/or destructively interfere with the audio waveform of the underlying audio content. That distortion of the underlying audio content may or may not be human perceptible. For instance, if the underlying audio content is loud white noise (e.g., as with the sound of applause), then the added sin waves of the audio watermark would probably not be human perceptible. But if the underlying audio content is more discrete or low level, then the added sin waves of the audio watermark may more likely be human perceptible.

When an entity seeks to insert an audio watermark at a desired time point in a media stream, the entity may first analyze the underlying audio content at that time point in the media stream to determine whether the audio watermark would be threshold human perceptible there—such as whether the audio watermark combined with the underlying audio content at that time point would interfere with the underlying audio content to a threshold human-perceptible extent. And the entity may then insert the audio watermark at that time point contingent upon the determination being that that the resulting interference would not be threshold human-perceptible, to help minimize the risk that a person may perceive distortion in the underlying audio content resulting from the added audio watermark.

Unfortunately, this means that there is no guarantee that the entity could insert the audio watermark at the desired time point in the media stream. There may be at least some situations where inserting of the audio watermark at the desired time point would create the threshold human-perceptible audio distortion and therefore where the entity decides to not add the audio watermark at that desired time point.

Disclosed herein is a mechanism to help address this technical problem.

In accordance with the disclosure, a system will add into a media stream some overtly human-perceptible supplemental audio content that is coincident in time with an audio watermark in the media stream. Optimally, this supplemental audio content can thereby help to mask any human-perceptible effects of the audio watermark on the underlying audio content, as a human user who would hear such an effect of the audio watermark would instead hear the combination of the audio watermark and the overtly human-perceptible supplemental audio content, in place of or together with the underlying audio content.

Furthermore, the added supplemental audio content could be an audio cue for notifying a human user of the interactive event that is or will be triggered by the coincident audio watermark. For example, the supplemental audio content could be an alert sound, such as ringing, buzzing, or one or more other tones or audio recordings, that could signify occurrence of the interactive event. Where the audio watermark triggers presentation of a prompt for a user to purchase a good or service related to a current or upcoming advertisement in the media stream, for instance, such an audio cue could alert a user to the presentation of that prompt.

Having the added supplemental audio content be an audio cue that alerts a user to the interactive event triggered by the audio watermark can optimally give the supplemental audio content a human-perceptible purpose, justifying the added presence of the supplemental audio content from the perspective of a human listener. Namely as a person is listening to the media stream being played out, the person can hear the added supplemental media content as the audio cue, while the supplemental media content also happens to be masking the audio effect of the audio watermark on the underlying audio content of the media stream.

Further, in a scenario where the added supplemental audio content is an audio cue for alerting a user to interactive event, the supplemental audio content could be structured as audio that matches a characteristic of the interactive event. For instance, in conjunction with a commercial for a carbonated beverage, if the audio watermark triggers presentation of a prompt for a user to purchase the advertised beverage or an associated good or service, the supplemental audio content that is added coincident with that audio watermark could be the popping sound of a soda can opening. That supplemental audio content could thus not only help mask the audio effect of the audio watermark but could function as a themed, entertaining cue for the user to notice and/or respond to the beverage-purchase prompt.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 6 is a simplified block diagram of an example system operable in accordance with the disclosure.

FIG. 7 is a simplified block diagram of an example content presentation device operable in accordance with the disclosure.

DETAILED DESCRIPTION

Figure 1:
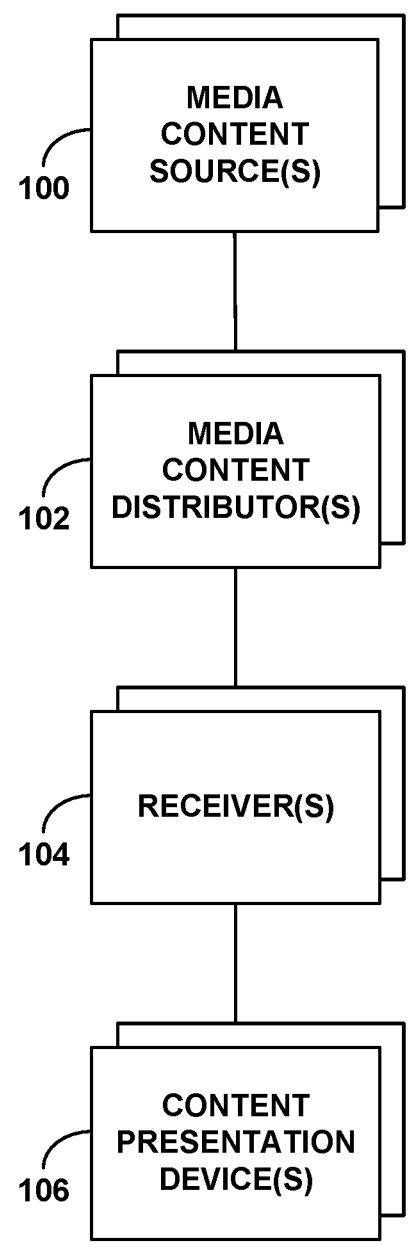
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., MVPDs, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., TVs or other display devices, loudspeakers or other audio output devices, etc.) Further, a content presentation device 106 could have an integrated receiver 104.

In an example implementation, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 106 could then be situated at customer premises, such as homes or business establishments.

With this or other arrangements, the content sources 100 could deliver media content to the content distributors 102, the content distributors 102 could distribute the media content to receivers 104 at customer premises, the receivers 104 could output the media content for presentation by content presentation devices 106, and the content presentation devices could present the media content. For example, the content sources 100 could deliver linear media streams to the media distributors 102, and the media distributors 102 could then distribute the media streams on discrete channels (e.g., particular frequencies or other defined channels) and/or on-demand to the receivers 104 at customer premises. Each receiver could then output a user-requested media stream, such as the media stream of a user-requested channel, for presentation by a content presentation device 106. And the content presentation device 106 could present the media stream.

When a content presentation device 106 is presenting a media stream, it may be useful in certain situations to initiate an interactive event in relation to the media-stream presentation.

As noted above, without limitation, the interactive event could involve presentation of a prompt for user input or other user action, such as a prompt for a user to purchase a good or service related to content of the media stream. In an example implementation, initiating such an interactive event could involve the content presentation device or an associated receiver or other device superimposing onto the underlying content of the media stream a video and/or audio overlay that defines the prompt, possibly as an actionable video button or voice-command prompt. That way, as the content presentation device is presenting the media stream, the content presentation device would present the interactive prompt together with the underlying content of the media stream. Alternatively or additionally, while the content presentation device is presenting the media stream, a second device such as a user's cell phone, tablet, or smart watch could present a similar prompt on a user interface of the second device. Other examples of interactive events, not limited to purchasing of a good or service related to the media stream, and not limited to such prompting, could be possible as well.

As further noted above, one way to trigger initiation of an interactive event during presentation of the media stream is to include in the media stream a watermark that a computing system could detect and respond to by initiating the interactive event.

As is known in the art, watermarking typically involves permanently encoding or otherwise incorporating information into media content in a manner that enables the information to be extracted from the media content by a device that receives the media content. This is in contrast to inserting such information into a transport-stream packet header or the like without incorporating the information into the underlying media content itself. Typically, watermarking permanently changes the media content and may be impractical or impossible to remove.

More particularly, watermarking media content could involve incorporating into the media content a code or other data that represents or can be mapped to information. With the example above, for instance, watermarking could involve incorporating into the media content a code that, when detected by a recipient device, could cause the device to take action for initiating an interactive event, such as for presenting a user prompt or the like. For example, the recipient device could detect the watermarked code in the media content and, by reference to local mapping data or by querying a mapping server or other entity, could map that code to an action trigger or other logic according to which the device would take the action for initiating the interactive event. In an example implementation, a watermark code could be on the order of 24 bits.

At issue for present purposes is an audio watermark, i.e., watermarking done in audio of the media stream. As noted above, audio watermarking a media stream could involve adding to the underlying audio content of the media stream an audio waveform that represents the code or other data to be conveyed. Such an audio waveform could represent the code or other data through any of a variety of modulation techniques now known or later developed, examples of which include, without limitation, amplitude modulation, frequency modulation, and phase modulation. Therefore, the audio waveform of the watermark could comprise a sequence of sin waves that cooperatively represent the code or other data. Further, the sequence of sin waves could start with or have pre-pended a predefined waveform defining a sync symbol indicating the presence of the watermark.

As a device receives the media stream, the device could evaluate the audio of the media stream in search of the presence of an audio watermark. For instance, the device could run a fast Fourier transform (FFT) to convert a time-space representation of the audio waveform into its constituent frequency components, identifying frequencies that contain threshold energy, and looking for predefined sequences. Upon detecting a sync symbol indicating presence of the watermark, the device could then decode the watermark to extract the code or other data represented by the watermark. Other audio watermark encoding and detection processes are possible as well.

In an example implementation as noted above, such an audio watermark could be inserted at a desired time position in the media stream. For example, in a scenario where the audio watermark will trigger an interactive event related to specific content of the media stream such as a particular advertisement in the media stream, the audio watermark could be inserted in the media stream at a time point that is at or just preceding the occurrence of that specific content of the media stream. More particularly, the audio watermark could be placed in the media stream near in time to when the interactive event is to occur, possibly considering any delay period for triggering the interactive event upon detecting the watermark.

Figure 2:
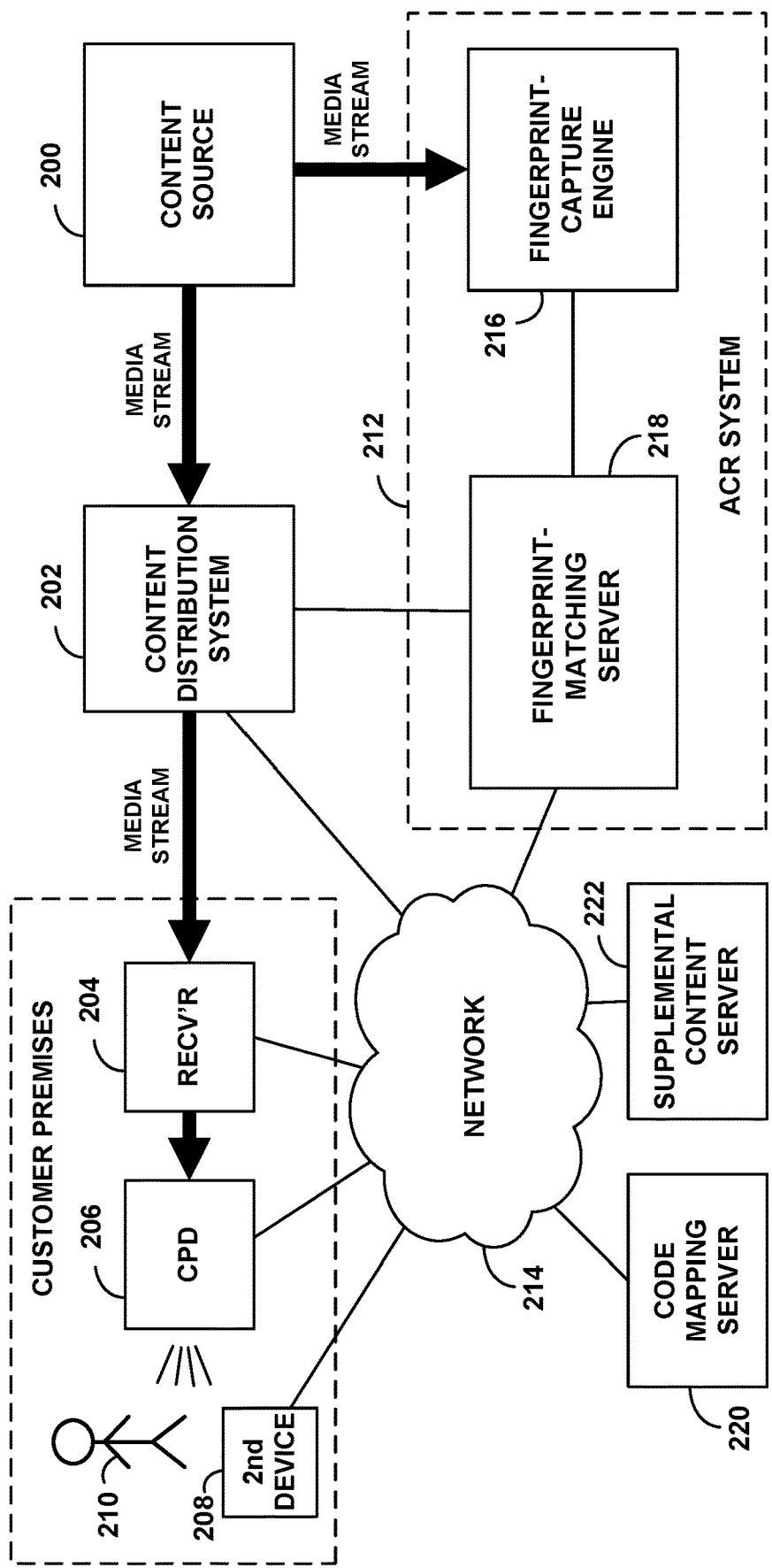
FIG. 2 is another simplified block diagram of an example system in which various disclosed principles can be applied.

FIG. 2 shows an example system in which a which an audio watermark could be added to audio of a media stream at a desired time point, and where a downstream entity could then detect that audio watermark in the media stream and responsively take action to trigger an interactive event.

In particular, FIG. 2 illustrates an example media distribution path along which a media stream could be conveyed from a content source 200 to a content presentation device 206 and perhaps further to a second device 208 within audio range of the content presentation device 206. In the arrangement shown, the content source 200 transmits the media stream to a content distribution system 202, and the content distribution system then transmits the media stream in real time or on demand to customer premises equipment such as a receiver 204 serving or integrated with the content presentation device 206. The content presentation device 206 then plays out the media stream to a human user 210. Further, the second device 208 within audio range of the playout by the content presentation device 206 could receive and process at least the played-out audio of the media stream.

In an example implementation, the media stream could be one selected by the user 210 for playout by the content presentation device 206. For instance, the user 210 might operate a remote control to direct the receiver 204 to provide a particular channel that carries the media stream, and the receiver 204 might responsively obtain the media stream of that channel from the content distribution system 202 and output that media stream for presentation by the content presentation device 206. Alternatively, the media stream might be one that the receiver previously received and stored for later playout, and the user might direct playout of that previously stored media stream.

The media stream at issue could be conveyed in digital form along much of the media distribution path. For example, the media stream could be digitized and transmitted in a packet-based transport stream from the content source 200 to the content distribution system 202 and from the content distribution system 202 to the receiver 204. And as the receiver 204 receives and/or outputs the transport stream, the receiver could extract the digitized media stream from the transport stream and convey the extracted digitized media stream through a local interface or internally to the content presentation device 206 for playout. And as the content presentation device 206 receive the media stream, the content presentation device 206 could convert the digitized media stream to analog form and could present the content of the media stream to user 210.

Further, the media stream could comprise both video and audio components, or at least an audio component. An example video component could comprise a sequence of video frames defining video content that the content presentation device could present on a display screen for viewing by the user 210. And an example audio component could comprise an audio track (e.g., corresponding with a video track) defining audio content that the content presentation device could present through a sound speaker or other audio output mechanism, to be heard by the user 210 and possibly received by a microphone or other audio input mechanism of the second device 208.

Still further, the media stream could comprise both program content and advertising content. For instance, the media stream might be a TV broadcast stream that includes one or more TV programs with interspersed commercial breaks or with product or service placement within the TV program content. Alternatively, the media stream could take other forms.

With this example arrangement, any of the various illustrated entities in the media distribution path could insert the audio watermark at a desired time point in the media stream.

Further, any such entity might do so in response to a determination that the media stream contains content in relation to which it may be desirable to trigger the interactive event. For instance, an entity might insert the audio watermark into the media stream at or near a time point in the media stream of a commercial that advertises a good or service, with the audio watermark causing a downstream recipient device to trigger an interactive event related to that good or service, such as presenting a user prompt for a user to obtain more information about the good or service and/or to purchase the good or service.

By way of example, the content source 200 or content distribution system 202 could insert the audio watermark in the media stream in response to inserting of the commercial into the media stream. For instance, equipment of the content source 200 or content distribution system 202 may be responsible for inserting the commercial into the media stream in the first place. In response to inserting of the commercial into the media stream, that or other equipment of the content source 200 or content distribution system 202 could thus also insert into the media stream, at or near the time point of the commercial in the media stream, an audio watermark for triggering the interactive event related to the commercial.

As another example, a media client such as the receiver 204 or content presentation device 206 could insert the audio watermark into the media stream in response to detecting of preexisting presence of the commercial in the media stream. For instance, the media client could engage in out-of-band communication with a network-based automatic content recognition (ACR) system 212 that detects the presence of the commercial in the media stream as the media stream is en route to the media client and that responsively causes the media client to insert the audio watermark into the media stream at or near the time of the commercial.

The out-of-band communication between the media client and the ACR system 212 could be through a broadband network 214 such as the Internet. Given typical transmission delay for transmission of media content along the media distribution path to the media client, this out-of-band communication may allow the ACR system 212 to give the media client advanced notice of the coming commercial and/or time point where the media client should insert the audio watermark into the media stream.

In this process, the ACR system 212 could use any of a variety of technique to detect presence of the commercial in the media stream that is en route to the media client. By way of example, the ACR system 212 could use digital fingerprint matching to detect presence of the commercial, by comparing pre-provisioned digital fingerprints of the commercial with digital reference fingerprints of the media stream that is en route to the media client.

To facilitate this, the ACR system 212 could include or interwork with a fingerprint-capture engine 216 that receives from the content source 200 a copy of the media stream that is en route to the media client and that generates digital reference fingerprints of the audio and/or video content of that media stream. Further, the ACR system 212 could include a fingerprint-matching server 218 that is pre-provisioned with digital fingerprints of the commercial and that regularly compares those fingerprints with the generated reference fingerprints of the media stream en route to the media client, in an effort to detect presence of the commercial in that media stream.

Upon finding a fingerprint match with sufficient certainty, the ACR system 212 could thus conclude that the commercial is present in the media stream being received by the media client. And through network 214, the ACR system 212 could responsively inform the media client of that fact and could inform the media client of the time point in the media stream where the commercial is present and/or where in time relation to that time point in the media stream the media client should insert the audio watermark. The media client could then responsively insert the audio watermark into the media stream at or near the indicated time point.

For the ACR system 212 to carry out this process, the ACR system 212 may need to know in the first place which media stream is being received by the media client, so that the ACR system 212 can conduct the fingerprint matching with respect to reference fingerprints of that particular media stream. To facilitate this, the media client could also include a fingerprint-generator that generates query digital fingerprints of the media stream as the media client receives the media stream, and media client could regularly transmit those query fingerprints to the ACR system 212. The ACR system 212 could then regularly compare those query fingerprints with reference fingerprints generated by the fingerprint-capture engine 216 respectively for each of various media streams output by content source 200 and/or by one or more other content sources. And upon finding with sufficient certainty that the query fingerprints match the reference fingerprints of a given media stream, the ACR system 212 could conclude that that given media stream is the media stream being received by the media client.

Further, in this process, the ACR system 212 could inform the media client in various ways what the time point is of the commercial in the media stream and/or where in time relation to that time point the media client should insert the audio watermark. For instance, the ACR system 212 could determine time when the ACR system 212 detected the commercial according to a clock at the ACR system 212, and the ACR system 212 or the media client could map that time to a time according to a clock at the media client, accounting for the transmission delay along the media distribution path. Alternatively, if frames of the media stream are time-stamped, the reference fingerprints could be correspondingly timestamped, and the ACR system 212 could inform the media client of the timestamp of a start of the commercial in the media stream. With these or other processes, the media client could then insert the audio watermark into the media stream at or in relation to the indicated time point.

As yet another example, the content distribution system 202 might insert the audio watermark into the media stream in response to detecting preexisting presence of the commercial in the media stream. Here too, the ACR system 212 could operate to detect presence of the commercial in the media stream that is en route to the media client. The ACR system 212 could then responsively inform the content distribution system 202 of that fact and could likewise inform the content distribution system 202 of the time point in the media stream where the commercial is present and/or where in time relation to the commercial in the media stream the content distribution system should insert the audio watermark. And the content distribution system could then responsively insert the audio watermark into the media stream at or near that time point.

In these fingerprint-based ACR processes, digital fingerprinting could be done with respect to video and/or audio as applicable for a given media stream. Digital fingerprinting with respect to video, for instance, could apply on a per video frame basis and could involve establishing a representation of luminosity and/or other video characteristics. By way of example, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting mechanisms, including possibly audio fingerprinting, could be used as well.

Fingerprint-matching could also take various forms. By way of example, to compare digital fingerprints, the fingerprint-matching server 218 could compare corresponding portions of the fingerprints with each other to determine whether the portions match exactly or within defined tolerances. For example, the server could compute a maximum deviation between the fingerprints and determine if the maximum deviation is within a predefined tolerance. If the fingerprints are binary, this could be a Boolean determination or could involve computing a Hamming distance (as a count of mismatches between respective bit locations in the fingerprints). And if the fingerprints are more complex values, such as decimal values or vectors (e.g., grey values per video frame region), this could involve determining a distance between the values or vectors. Other examples are possible as well.

In an example implementation, once the audio watermark has been inserted into the media stream, any of various downstream entities could then detect presence of the watermark in the media stream and could responsively trigger the interactive event as discussed above.

By way of example, if the audio watermark has been inserted into the media stream before the media stream is being processed by the content presentation device 206 for playout (e.g., if the audio watermark was inserted by the content source 200, the content distribution system 202, or the receiver 204), then the content presentation device 206 could detect the audio watermark in the media stream and could responsively take action to initiate the interactive event. The content presentation device 206 could detect the audio watermark by evaluating the analog audio waveform of the media stream and/or perhaps by analyzing a digitized version of the audio waveform if the digitized version adequately represents the waveform to enable detection of the watermark.

For instance, upon detecting presence of the audio watermark, the content presentation device 206 could extract a code represented by the audio watermark as noted above, and the content presentation device 206 could map that extracted code to the action to be taken, or could query a code-mapping server 220 via the network 214. The code-mapping server 220 could store mapping data, such as a table or more complicated relational database or the like, that maps various watermark codes to associated actions.

The code-mapping server 220 might, for instance, map the extracted code to both (i) an action to be taken by the content presentation device 206 and (ii) associated supplemental content that the content presentation device 206 could obtain from a supplemental-content server 222 to facilitate taking the action. Thus, based on the extracted code, the code-mapping server 220 might return to the content presentation device 206 an action directive that is interpretable by the content presentation device 206 to carry out a particular action for initiating the interactive event, and the code-mapping server 220 might also return to the content presentation device a network address (e.g., universal resource locator (URL) of the supplemental content for the content presentation device 206 to obtain.

Without limitation, the supplemental content could be structured as a markup document, such as a hypertext markup language (HTML) document that defines a video overlay use interface with one or more actionable elements, and the content presentation device 206 could be programed with a web browser application that is executable to render that markup document and/or with other logic executable to present the defined video overlay over the underlying video content of the media stream being presented. Such a video overlay may present information related to the advertised good or service and may include a hyperlinked button that the user 210 could invoke by use of a remote control or touch screen, which may cause the web browser application to navigate to and present a web page of an online store where the user 210 could purchase the good or service, among other possibilities.

As another example, if the audio watermark has been inserted into the media stream before the media stream arrives at the receiver 204 (e.g., if the audio watermark was inserted by the content source 200 or the content distribution system 202), then the receiver 204 could detect the audio watermark in the media stream and could responsively take action to initiate the interactive event. The receiver 204 could detect the audio watermark by converting digitized audio of the media stream to analog form and evaluating that analog waveform, and/or likewise by evaluating the digitized version of the waveform.

As with the content presentation device 206, the receiver 204 could then extract the code from the watermark and map that code to an action and perhaps associated supplemental content. The receiver 204 could then modify the media stream en route to the content presentation device 206 to add a video overlay defining a user interface like that described above, so that when the content presentation device 206 presents the video of the media stream, the content presentation device would present the overlay with it.

As still another example, if the audio watermark has been inserted into the media stream before the media stream arrives at the content distribution system 202 (e.g., if the audio watermark was inserted by the content source 200), then the content distribution system 202 could detect the audio watermark in the media stream and could responsively take action to initiate the interactive event. The operations involved here could be similar to those described above with respect to the receiver 204.

As yet another example, assuming the audio watermark has been inserted into the media stream by the time the content presentation device plays out the audio of the media stream (e.g., if the audio watermark was inserted by the content source 200, the content distribution system 202, the receiver 204, or the content presentation device 206), then the second device 208 could receive the played-out audio of the media stream and could detect the audio watermark in the media stream and responsively take action to initiate the interactive event.

As noted above, the second device 208 might be a device such as a cell phone, tablet, or smart watch operated by the user 210. The second device 208 could include a microphone that receives audio from its environment, to enable the second device to evaluate the audio for presence of the audio watermark. Thus, if the microphone of the second device 208 is positioned close enough to the audio-output mechanism (e.g., speaker) of the content presentation device 206 when the content presentation device is presenting the audio of the media stream, the second device 208 could receive the audio of the media stream being played out and could detect in that received audio the audio watermark.

Responsive to detecting the audio watermark in the media stream, the second device 208 could take action similar to the action noted above that could be taken by the content presentation device 206 For instance, the second device 208 could likewise map the watermarked code to an action and user-interface to present, possibly as a video and/or audio overlay on top of any content currently being presented by the second device. And here too, the user interface could define a call to action for the user 210, possibly prompting the user to visit a page that may provide information related to the commercial in the media stream, among other possibilities.

As discussed above, inserting the audio watermark into the audio of the media stream could involve adding to the underlying audio content of the media stream the audio waveform of the audio watermark. But as further noted above, the addition of this watermark waveform could constructively and/or destructively interfere with the waveform of the underlying audio content of the media stream, which could result in audio distortion that could be perceptible to the user 210.

Figure 3:
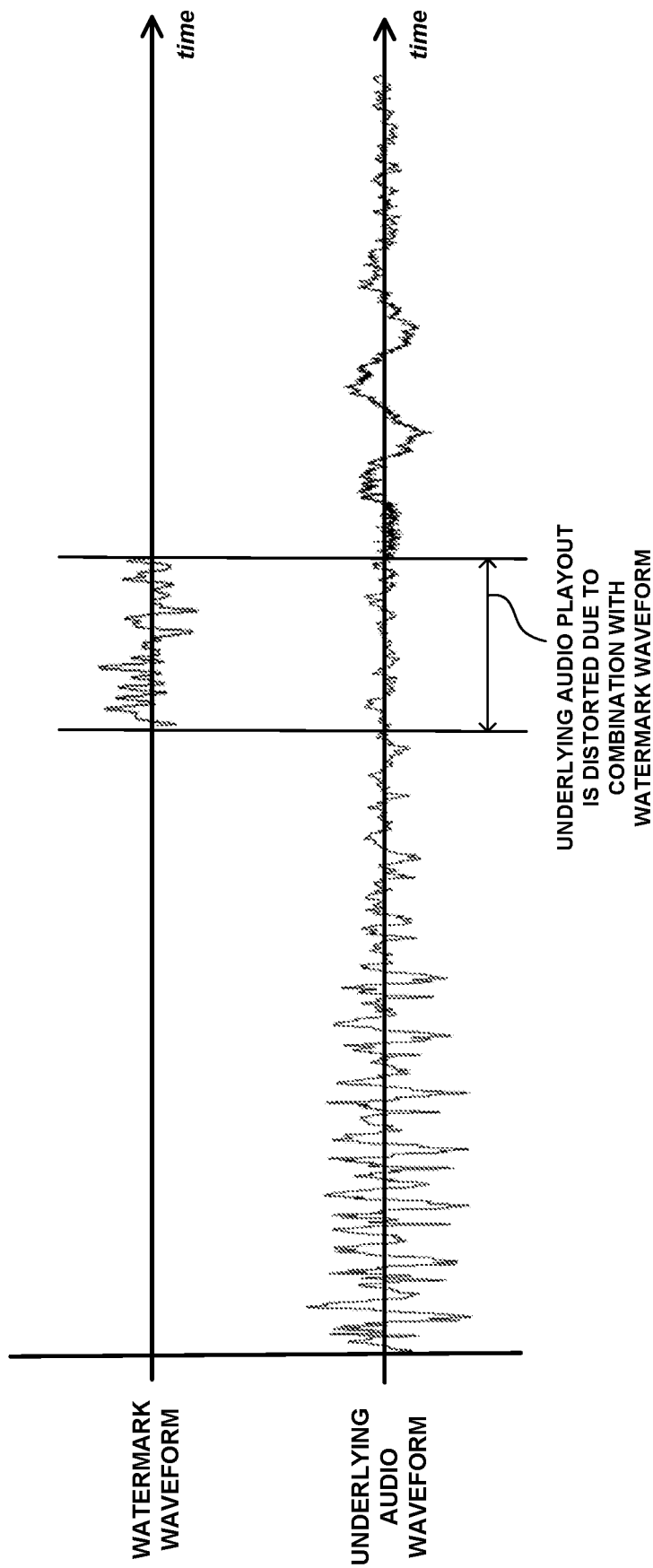
FIG. 3 is timing diagram depicting underlying audio content of a media stream and an audio watermark that would be added into a segment of the media stream.

FIG. 3 illustrates this by way of example. Namely, FIG. 3 shows an example underlying audio waveform of the media stream and shows the watermark waveform occupying a range of time coincident with a segment of the underlying audio waveform. Combining the watermark waveform with that segment of the underlying audio waveform could result in distortion of the underlying audio waveform. For instance, portions of the watermark waveform may constructively interfere with portions of the underlying audio waveform, and/or portions of the watermark waveform may destructively interfere with the underlying audio waveform, with such interference cooperatively resulting in distortions such as volume changes, noise, or the like. And as the user 210 is listening to continuous audio of the media stream being played out, the user 210 may therefore hear this distortion, which is undesirable.

According to the present disclosure, as noted above, a computing system could help overcome this problem by adding into the media stream some overtly human-perceptible supplemental audio content placed coincident in time with the audio watermark. The point here is that the supplemental audio content can mask the perceptible audio effect of the audio watermark, since the user 210 could hear the supplemental audio content as a more intentional disruption of the underlying audio content of the media stream. Although the audio watermark may have a distorting effect on the supplemental audio content, that distortion would not merely be an interruption of the continuous underlying audio content of the media stream but would rather become part of the intentionally inserted supplemental audio content.

Further, as noted above, the added supplemental audio content could also serve as a human-perceptible cue for the interactive event that the audio watermark triggers. Namely, the supplemental audio content could serve to alert the user 210 to interactive event, which might help direct the user's attention to a presented video overlay or the like related to the interactive event.

The supplemental audio content could be a sound such as a buzzer, bell, tone sequence, speech, animal sound, or a recording of any sort of sound effect that might be of interest. Optimally, the supplemental audio content should be of sufficient amplitude to serve the present purpose(s). Further, as noted above, the supplemental audio content could be themed with one or more characteristics related to the interactive event, such as by being an audio recording of a sound related to an advertised good or service to which the interactive event may relate, among other possibilities.

Figure 4:
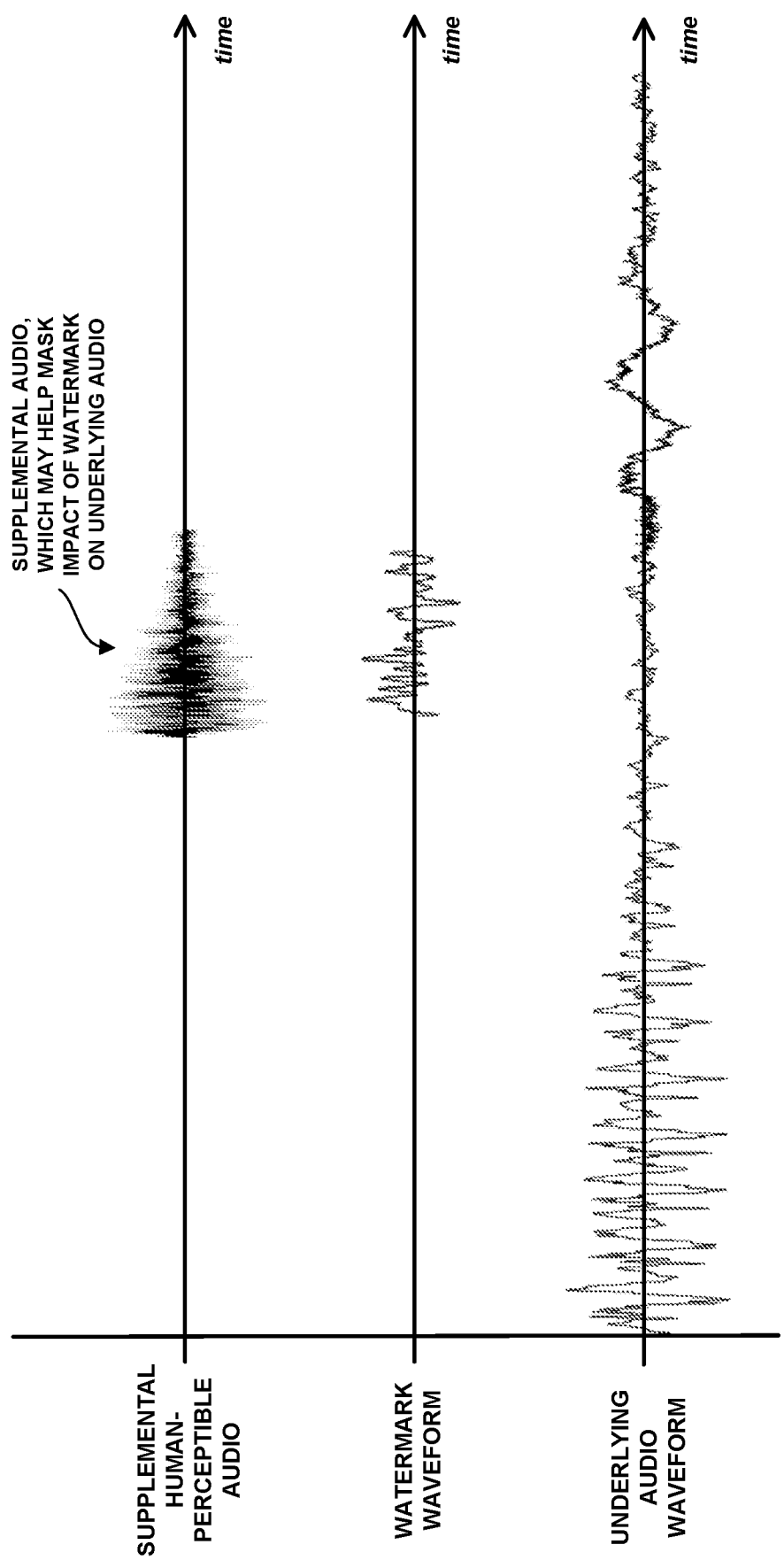
FIG. 4 is a variation of the timing diagram of FIG. 3, showing overtly human-perceptible supplemental audio content that would be added to the media stream with time positioning coincident with the audio watermark, to help mask audio effects of the audio watermark on the underlying audio content of the media stream.

FIG. 4 illustrates how this could work in practice, as a modification of the waveform arrangement of FIG. 3. As shown in FIG. 4, the supplemental overtly-human-perceptible audio is added to the media stream coincident (i.e., overlapping in time) with the audio watermark waveform. As illustrated by way of example, the supplemental audio waveform could be a relatively high frequency, relatively high amplitude waveform compared with what might be the underlying audio content of the coincident media stream segment and perhaps compared with the audio watermark waveform.

The combination of this supplemental audio content with the audio watermark and the underlying audio content could thus result in audio that is predominantly the supplemental audio content, so that the user 210 may likely hear the supplemental audio content as an interruption of the underlying audio content rather than or in addition to hearing an audio effect of the audio watermark as a distortion of the underlying audio content.

A computing system could add such supplemental audio content to the media stream at the time the audio watermark is being added to the media stream. For instance, the computing system could add into the media stream a combination of the supplemental audio content and the audio watermark, thus concurrently (i) watermarking the media stream and (ii) adding into the media stream the supplemental audio content to help mask the audible effect of the audio watermark with respect to the underlying audio content. More specifically, the computing system could add into the media stream the supplemental audio content encoded with the audio watermark. Here, for instance, the computing system could operate as discussed above to determine a time point in the media stream at which to insert the audio watermark, and the computing system could then responsively insert into the media stream at that time point not just the audio watermark but the combination of the audio watermark and the supplemental audio content.

Further, in this implementation, as a variation from the illustration of FIG. 4, the computing system might fully splice into the media stream the combination of the supplemental audio content and the audio watermark, i.e., replacing the coincident segment of the underlying audio content. That way, the resulting media stream at that segment would be just the supplemental audio content and the audio watermark. And the computing system could add appropriate fading to help smooth the transition into and back out of that added audio.

Alternatively, rather than adding the combination of the audio watermark and the supplemental audio content, a computing system could receive the media stream already including the audio watermark and could detect the audio watermark and responsively add the supplemental audio content to be coincident with the detected audio watermark. Here, for instance, the computing system could detect the existing audio watermark in largely the same manner as discussed above. And the computing system might then query the code-mapping server 220 to determine and possibly obtain from the supplemental-content server 222 the supplemental audio content to be added coincident with the audio watermark. And the computing system could then add that supplemental audio content into the media stream coincident in time with the preexisting audio watermark.

Any of various entities could implement this computing system and thus carry out these or other such operations.

By way of example, the content presentation device 206 could do so.

For instance, if the content presentation device 206 inserts the audio watermark into the media stream, the content presentation device 206 could also insert together with the audio watermark the supplemental audio content to help mask the audio watermark and possibly as a cue for the interactive event that the audio watermark would trigger.

Alternatively, if the media stream already contains the audio watermark, the content presentation device 206 could detect the presence of the audio watermark and could responsively add the supplemental audio content coincident with the detected audio watermark. To facilitate this as the content presentation device 206 is playing out the media stream, the content presentation device 206 could operate on buffered upcoming content of the media stream. For instance, the content presentation device 206 may regularly receive and buffer media content that the content presentation device 206 is going to present. The content presentation device 206 could thus evaluate that buffered media content in search of the audio watermark and, upon finding the audio watermark, could responsively add the supplemental audio content with time placement selected to be at least partially coincident with time position of the audio watermark.

As another example, an intermediary or other entity in the media distribution path along which the media stream would flow to the content presentation device could carry out such operations. For instance, the content source 200, content distribution system 202, or receiver 204 could likewise add the supplemental audio content together with the audio watermark or could detect pre-existing presence of the audio watermark in the audio content of the media stream and could add the supplemental audio content similarly with time placement selected to be at least partially coincident with the time position of the audio watermark.

Figure 5:
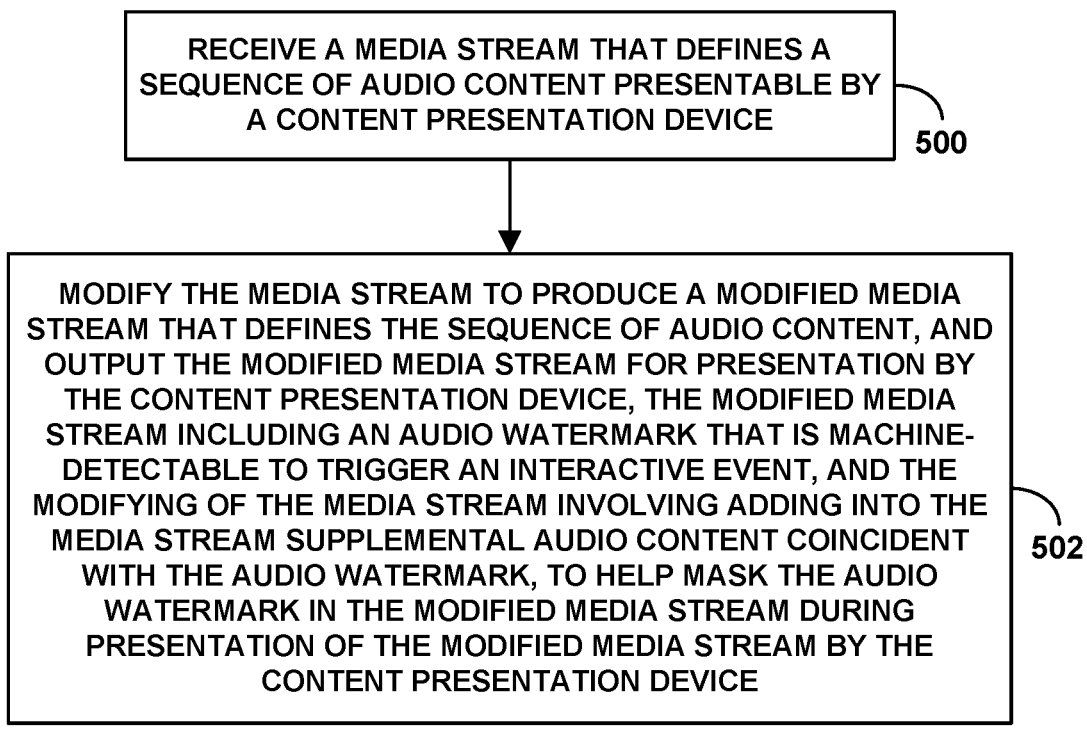
FIG. 5 is a flow chart depicting a method that could be carried out in accordance with the disclosure.

FIG. 5 is a flow chart depicting a method that could be carried out in accordance with the present disclosure. This method could be carried out by a computing system at one more entities such as at one of the entities discussed above for instance.

As shown in FIG. 5, at block 500, the method involves receiving a media stream that defines a sequence of audio content presentable by a content presentation device. And at block 502, the method involves modifying the media stream to produce a modified media stream that defines the sequence of audio content, and outputting the modified media stream for presentation by the content presentation device, the modified media stream including an audio watermark that is machine-detectable to trigger an interactive event, and the modifying of the media stream involving adding into the media stream supplemental audio content coincident with the audio watermark, to help mask the audio watermark in the modified media stream during presentation of the modified media stream by the content presentation device.

In line with the discussion above, the sequence of audio content defined by the media stream could be an audio track of the media stream or could be the media stream itself as in the case of an audio-only media stream. Further, the sequence of audio content defined by the media stream is human-perceptible when presented by the content presentation device. For instance, the audio content could have a frequency range that lies within the frequency range of typical human hearing, such as from 20 Hz to 20 kHz.

Further, as discussed above, the supplemental audio content is similarly human-perceptible when presented by the content presentation device and could be structured to have an amplitude and/or one or more other audio characteristics that help the supplemental audio content be heard when presented concurrently with or as a replacement for a segment of the underlying audio content of the media stream.

In addition, as discussed above, the supplemental audio content could define an audio cue for notifying a human user of the interactive event. For instance, the supplemental audio content could be a sound effect that is associated with a subject of the interactive event or otherwise matching a characteristic of the interactive event, so as to help attract the user to the interactive event. And as further noted above, the interactive event could involve presentation of a prompt for a user to purchase a good or service advertised in the media stream, among other possibilities.

Also in line with the discussion above, the audio watermark could be machine-detectable by having a predefined format such as a pre-pended sync symbol or the like, so that a machine (e.g., one of the entities discussed above) can detect the watermark and can then read a code or other data represented by the watermark.

Yet further, as discussed above, the audio watermark could be detectable to trigger the interactive event by a second device during presentation by the content presentation device of the audio content of the modified media stream. For instance, the audio watermark could represent a code or other data that a device could detect and to which the device may respond by taking an action to initiate the interactive event.

Still further, in an embodiment as discussed above, the media stream as received may not include the audio watermark, and the supplemental audio content may be encoded with the audio watermark, e.g., as an audio combination of the supplemental audio content and the audio watermark. And in that case, the act of adding into the media stream the supplemental audio content coincident with the audio watermark could involve adding into the media stream the supplemental audio content encoded with the audio watermark. For instance, this could involve adding the supplemental audio content encoded with the audio watermark into the media stream at a time position in the media stream that is determined or otherwise selected based on a fingerprint-based ACR analysis as discussed above or the like.

Alternatively, as further discussed above, the media stream as received may include the audio watermark already. And in that case, the act of adding into the media stream the supplemental audio content coincident with the audio watermark could involve (i) determining a time position of the audio watermark in the media stream such as by detecting presence of the audio watermark in the media stream, the detecting being at the time position, and (ii) based on determining the time position of the audio watermark in the media stream, adding into the media stream the supplemental audio content coincident with the determined time position, i.e., coincident with at least a portion of the audio watermark.

As additionally discussed above, this method could be carried out by the content presentation device. Or the method could be carried out by an intermediary in a path of transmission of the media stream to the content presentation device, among other possibilities. For instance, the method could be carried out by an MVPD that conveys the media stream along the path, among other possibilities. Or in a scenario where the content presentation device is a television, the intermediary might be a set top box that serves the television.

FIG. 6 is next a simplified block diagram of an example computing system that could be operable in accordance with the present disclosure. This computing system could be implemented at and by one or more entities as discussed above, among other possibilities, so the components of the computing system could be components of one or more such entities. As shown in FIG. 6, the example computing system includes a network communication interface 600, a processing unit 602, non-transitory data storage 604, any or all of which could be integrated together or, as shown, communicatively linked together by a system bus, network, or other connection mechanism 606.

Network communication interface 600 could comprise one or more physical network connection mechanisms to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 602, could comprise one or more general purpose processors (e.g., microprocessors) and/or one or more specialized processors (e.g., application specific integrated circuits). And non-transitory data storage 604 could comprise one or more volatile and/or non-volatile storage components, such as optical, magnetic, or flash storage.

As shown, the data storage 604 of the example computing system stores program instructions 608, which could be executable by processing unit 602 to carry out various operations described herein, such as the operations of the method of FIG. 5 for instance.

Various features described above could be implemented in this context as well, and vice versa.

Finally, FIG. 7 is a simplified block diagram of an example content presentation device that could be operable in accordance with the present disclosure. In line with the discussion above, this content presentation device could take various forms. For instance, it could be a television, a loudspeaker, a pair of headphones, or other device that operates to receive and render audio content. Numerous other examples are possible as well.

As shown in FIG. 7, the example content presentation device includes a content input interface 700, a content presentation interface 702, a network communication interface 704, a processing unit 706, and non-transitory data storage 708, any or all of which could be integrated together or, as shown, communicatively linked together by a system bus, network, or other connection mechanism 710.

Content input interface 700 could comprise a physical communication interface for receiving media content to be presented by the content presentation device. As such, the content input interface 700 could include one or more wired and/or wireless interfaces for establishing communication with and receiving media content in analog or digital form from a receiver or other device or system. For example, the media input interface 700 could include one or more interfaces compliant with protocols such as DVI, HDMI, VGA, USB, BLUETOOTH, WIFI, among numerous others.

Content presentation interface 702 could then comprise one or more components to facilitate presentation of the received media content. By way of example, the content presentation interface 702 could comprise user-interface components such as a display screen and a loudspeaker, as well as one or more drivers or other components for processing the received media content to facilitate presentation of the content.

Network communication interface 704 could comprise a physical network connection mechanism to facilitate communication on a network, and/or for engaging in direct or networked communication with one or more other local or remote entities. As such, the network communication interface 704 could comprise a wireless or wired Ethernet interface or other type of network interface, for engaging in Internet Protocol (IP) communication and/or other type of network communication.

Processing unit 706 could then comprise one or more general purpose processors (e.g., microprocessors) and/or one or more specialized processors (e.g., application specific integrated circuits). And non-transitory data storage 708 could comprise one or more volatile and/or non-volatile storage components, such as optical, magnetic, or flash storage. Further, as shown, data storage 708 stores program instructions 712, which could be executable by processing unit 706 to carry out various operations described herein.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described herein.

Exemplary embodiments have been described above. Those skilled in the art will understand, however, that changes and modifications may be made to these embodiments without departing from the true scope and spirit of the invention.

For instance, while the above discussion focused on audio watermarks, the principles discussed could be extended to apply with respect to video watermarks, as video watermarks might distort underlying video content, in which case presenting overtly human-perceptible video overlay-content coincident with the video watermark may help to mask the video watermark and could likewise serve as a cue for an interactive event that would be triggered by the video watermark. Other examples may exist as well.

What is claimed is:
1. A method comprising:
receiving a media stream that defines a sequence of audio content; and
modifying the media stream to produce a modified media stream that defines the sequence of audio content, and outputting the modified media stream, wherein the modified media stream includes an audio watermark that is machine-detectable to trigger an interactive event, wherein modifying the media stream comprises adding into the media stream supplemental audio content coincident with the audio watermark, and wherein the supplemental audio content added into the media stream coincident with the audio watermark defines an audio cue for notifying a human user of the interactive event.

2. The method of claim 1, wherein the sequence of audio content defined by the media stream is human-perceptible when presented by a content presentation device.

3. The method of claim 2, wherein the supplemental audio content is also human-perceptible when presented by the content presentation device.

4. The method of claim 1, wherein the supplemental audio content matches a characteristic of the interactive event.

5. The method of claim 1, wherein the interactive event comprises presentation of a prompt for a user to purchase a good or service advertised in the media stream.

6. The method of claim 1, wherein the audio watermark is detectable to trigger the interactive event by a second device during presentation by a first device of the audio content of the modified media stream.

7. The method of claim 1, wherein the method is carried out by a content presentation device.

8. The method of claim 1, wherein the method is carried out by an intermediary in a path of transmission of the media stream to a content presentation device.

9. The method of claim 8, wherein the content presentation device is a television, and wherein the intermediary is a multi-channel video program distributor (MVPD).

10. The method of claim 8, wherein the content presentation device is a television, and wherein the intermediary is a set top box serving the television.

11. A computing system comprising:
at least one processor;
non-transitory data storage; and
program instructions stored in the non-transitory data storage and executable by the at least one processor to carry out operations including:
receiving a media stream that defines a sequence of audio content, and
modifying the media stream to produce a modified media stream that defines the sequence of audio content, and outputting the modified media stream,
wherein the modified media stream includes an audio watermark that is machine-detectable to trigger an interactive event,
wherein modifying the media stream comprises adding into the media stream supplemental audio content coincident with the audio watermark, and
wherein the supplemental audio content added into the media stream coincident with the audio watermark defines an audio cue for notifying a human user of the interactive event.

12. The computing system of claim 11, wherein the sequence of audio content defined by the media stream is human-perceptible when presented by a content presentation device.

13. The computing system of claim 12, wherein the supplemental audio content is also human-perceptible when presented by the content presentation device.

14. The computing system of claim 12, wherein the supplemental audio content matches a characteristic of the interactive event.

15. The computing system of claim 11, wherein the computing system is at a content presentation device.

16. The computing system of claim 11, wherein the computing system is at an intermediary in a path of transmission of the media stream to a content presentation device.

17. The computing system of claim 11, wherein the interactive event comprises presentation of a prompt for a user to purchase a good or service advertised in the media stream.

18. A non-transitory computer-readable medium having stored thereon program instructions executable by at least one processor to carry out operations comprising:
receiving a media stream that defines a sequence of audio content; and
modifying the media stream to produce a modified media stream that defines the sequence of audio content, and outputting the modified media stream,
wherein the modified media stream includes an audio watermark that is machine-detectable to trigger an interactive event,
wherein modifying the media stream comprises adding into the media stream supplemental audio content coincident with the audio watermark, and
wherein the supplemental audio content added into the media stream coincident with the audio watermark defines an audio cue for notifying a human user of the interactive event.

19. The non-transitory computer-readable medium of claim 18, wherein the sequence of audio content defined by the media stream is human-perceptible when presented by a content presentation device, and wherein the supplemental audio content is also human-perceptible when presented by the content presentation device.

20. The non-transitory computer-readable medium of claim 18, wherein the supplemental audio content matches a characteristic of the interactive event.

* * * * *